United States Patent
Yoshifumi et al.

[11] Patent Number: 5,942,024
[45] Date of Patent: Aug. 24, 1999

[54] METHOD OF RECOVERING GOLD POWDER

[75] Inventors: Abe Yoshifumi; Inomata Takehiko, both of Ibaraki-Ken, Japan

[73] Assignee: Nippon Mining & Metals Co., Ltd, Hitachi, Japan

[21] Appl. No.: 08/862,835

[22] Filed: May 23, 1997

[30] Foreign Application Priority Data

May 27, 1996 [JP] Japan .................................. 8-131938

[51] Int. Cl.$^6$ ...................................................... B22F 9/24
[52] U.S. Cl. ................................................ 75/371; 75/741
[58] Field of Search .............................. 75/739, 741, 371

[56] References Cited

U.S. PATENT DOCUMENTS 4,390,366   6/1983   Lea et al. .................................. 75/739

*Primary Examiner*—Melvyn Andrews
*Attorney, Agent, or Firm*—Pennis & Edmonds LLP

[57] ABSTRACT

A method comprising the steps of solvent extracting a gold bearing chlorination leach solution with DBC, scrubbing the resulting gold bearing organic phase with hydrochloric acid and reducing gold is capable of recovering gold in high purity by:

(1) adjusting the concentration of hydrochloric acid in the gold bearing chlorination leach solution to 0.5–1.75 N before the solvent extraction and then scrubbing the resulting gold bearing organic phase with 0.25–0.75 N hydrochloric acid; and/or (2) performing five-stage scrubbing with hydrochloric acid by either one of the following three approaches: i) after three-stage scrubbing, centrifugal separation is effected and separation is then performed by filtration with a filter having an opening size of 0.05–5 $\mu$m, with the resulting organic phase being then subjected to two-stage scrubbing; ii) after five-stage scrubbing, centrifugal separation is effected and separation is then performed by filtration with a filter having an opening size of 0.05–5 $\mu$m; or iii) after three-stage scrubbing, centrifugal separation is effected and separation is then performed by filtration with a filter having an opening size of 0.05–5 $\mu$m, with the resulting organic phase being subjected to two additional stages of scrubbing, followed by centrifugal separation and separation by filtration with a filter having an opening size of 0.05–5 $\mu$m.

6 Claims, 4 Drawing Sheets

METHOD OF RECOVERING GOLD POWDER

BACKGROUND OF THE INVENTION

This invention relates to a method of recovering gold from gold bearing chlorination leach solutions.

Electrolytic refinery slimes have high concentrations of precious metal such as gold and silver and it is required to recover these precious metals in separate form from the slimes. One of the processes in commercial operation for gold recovery is described in J. E. Hoffmann, "Hydrometallurgical Processing of Kennecott Refinery Slimes" in the Proceedings of COPPER 95-COBRE 95 International Conference, Volume III—Electrorefining and Hydrometallurgy of Copper, The Metallurgical Society of CIM 1995. The process starts with the gold bearing leach solution obtained by chlorination leaching of decopperized slimes and comprises the steps of (1) extracting gold from the leach solution with dibutyl caribtol (DBC) used as an organic extractant, (2) scrubbing the resulting gold bearing organic phase with hydrochloric acid and (3) reducing gold in the organic phase with an added aqueous solution of a reducing reagent. Dibutyl carbitol which is not only stable but also low in volatility and toxicity is a suitable solvent for use in solvent extraction of gold from chloride bearing aqueous solutions. Because the distribution coefficient of gold between the organic phase of DBC and the aqueous phase is as high as about 1000–3000, it is anticipated that 99 wt % of the gold will be transferred into the organic phase if two-stage extraction with DBC is performed. The concentration of hydrochloric acid in the gold bearing leach solution is about 3 N because the concentration will not only provide high efficiency in chlorination leaching but also ensure the acuptable low level extraction of impurities into dibutyl carbitol. The gold bearing organic phase obtained in step (1) is scrubbed with HCL in step (2) because selenium, tellurium, arsenic, antimony and bismuth have been extracted together with gold. The scrubbing is usually performed through multiple stages in a countercurrent fashion on a batch or continuous basis employing 1–1.5 N HCl. Because of its high distribution coefficient between the DBC phase and the aqueous phase, gold is not stripped but reduced directly from the organic phase by contact with an aqueous solution of a reducing agent so as to produce metallic gold. Oxalic acid is used in most cases as the best reducing agent capable of recovering gold in high purity.

The purity of the gold recovered by the process described above is only about 99.997–99.998 wt % at maximum and needs to be further increased in purity.

SUMMARY OF THE INVENTION

The present invention has been accomplished under these circumstances and has as an object providing a method that is capable of recovering gold in purities higher than 99.998 wt %.

Another object of the invention is to provide a method by which the desired high-purity gold can be recovered in a simple way without prolonging the operation time.

Figure 1:
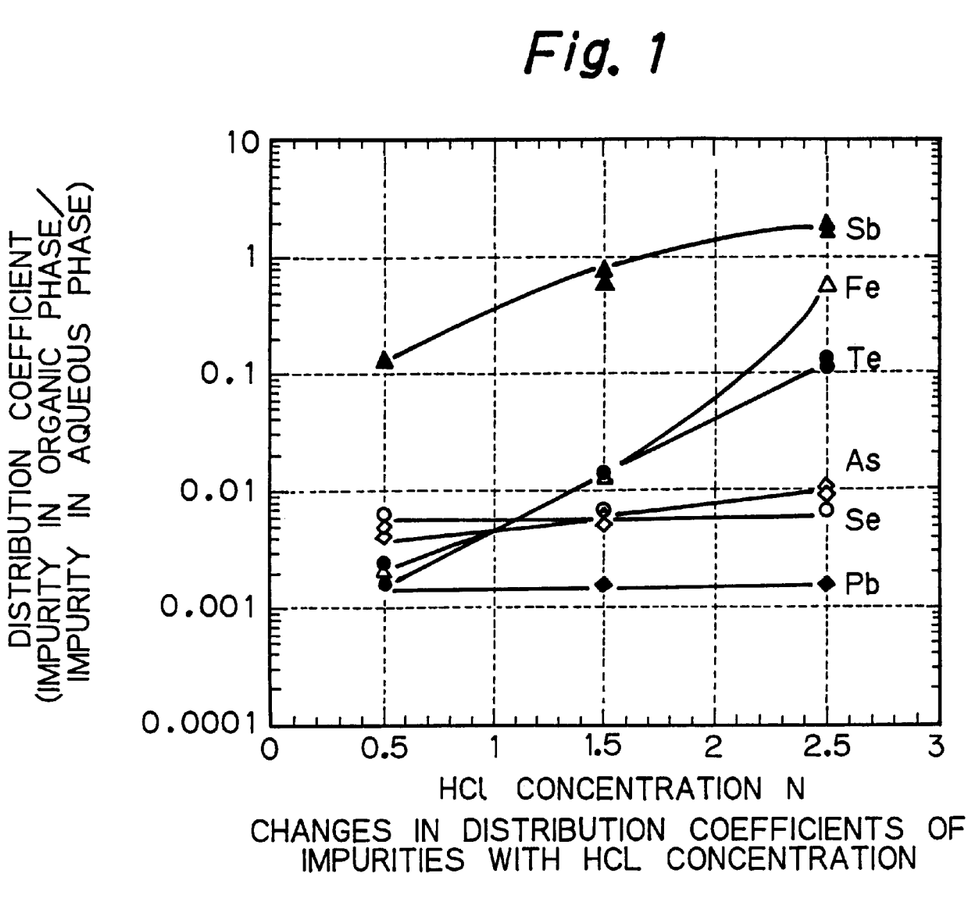
FIG. 1 is a graph showing the variations in the distribution coefficients of impurities with the concentration of hydrochloric acid.

The present inventors made intensive studies with a view to improving the conventional methods of gold recovery from various viewpoints. The studies consisted of investigating the variations in the distribution coefficients of impurities with the hydrochloric acid level in a method of gold recovery from a gold bearing chlorination leach solution comprising the steps of solvent extraction of gold from the leach solution with dibutyl carbitol (DBC), scrubbing the resulting gold bearing organic phase with hydrochloric acid and reducing gold from the organic phase with an added aqueous solution of a reducing agent. Since the inventors confirmed the results shown in FIG. 1, they continued the studies and found that gold could be obtained in a higher purity than 99.998 wt % by:

(1) adjusting the concentration of hydrochloric acid in the gold bearing chlorination leach solution to 0.5–1.75 N before the gold extraction and then scrubbing the resulting gold bearing organic phase with 0.25–0.75 N hydrochloric acid; and/or (2) performing five-stage scrubbing with hydrochloric acid by either one of the following three approaches: i) after three-stage scrubbing, centrifugal separation is effected and filtration is then performed with a filter having an opening size of 0.05–5 $\mu$m, with the resulting organic phase being then subjected to two-stage scrubbing; ii) after five-stage. Scrubbing, centrifugal separation is effected and filtration is then performed with a filter having an opening size of 0.05–5 $\mu$m; or iii) after three-stage scrubbing, centrifugal. Centrifugal separation is effected and filtration is then performed with a filter having an opening size of 0.05–5 $\mu$m, with the resulting organic phase being subjected to two additional stages of scrubbing, followed by centrifugal separation and filtration with a filter having an opening size of 0.05–5 $\mu$m.

The present invention has been accomplished on the basis of these findings.

The details of the present invention will become more apparent by reading the following description with reference to the accompanying drawings.

DETAILED DESCRIPTION OF THE INVENTION

According to an embodiment of the present invention, there is provided a method of recovering gold from a gold bearing chlorination leach solution which comprises the steps of solvent extraction of the leach solution with dibutyl carbitol (DBC), scrubbing the resulting gold bearing organic phase with hydrochloric acid and reducing gold from the organic phase with an added aqueous solution of a reducing reagent, said method being characterized in that the concentration of hydrochloric acid in the gold bearing chlorination leach solution is adjusted to 0.5–1.75 N before the solvent extraction and the resulting gold bearing organic phase is then scrubbed with 0.25–0.75 N hydrochloric acid.

According to another embodiment of the invention, a method of recovering gold from a gold bearing chlorination leach solution is provided there. The method is comprised of the steps of solvent extracting the leach solution with dibutyl carbitol (DBC), scrubbing the resulting gold bearing organic phase with hydrochloric acid and reducing gold from the organic phase with an added solution of a reducing agent, said method being characterized in that after three-stage scrubbing, centrifugal separation is effected and filtration is then performed with a filter having an opening size of 0.05–5 $\mu$m, followed by two-stage scrubbing of the resulting organic phase.

According to yet another embodiment of the invention, a method of recovering gold from a gold bearing chlorination leach solution is provided there. The method is comprised of the steps of solvent extracting the leach solution with dibutyl carbitol (DBC), scrubbing the resulting gold bearing organic phase with hydrochloric acid and reducing gold from the organic phase with an added aqueous solution of a reducing agent, said method being characterized in that after five-stage scrubbing, centrifugal separation is effected and filtration is then performed with a filter having an opening size of 0.05–5 $\mu$m.

In either embodiment, the scrubbing of the gold bearing organic phase is preferably preceded by centrifugal separation and subsequent filtration with a filter having an opening size of 0.05–5 $\mu$m. In another preferred embodiment, the time of solvent extraction is adjusted not to exceed 15 min.

Figure 4:
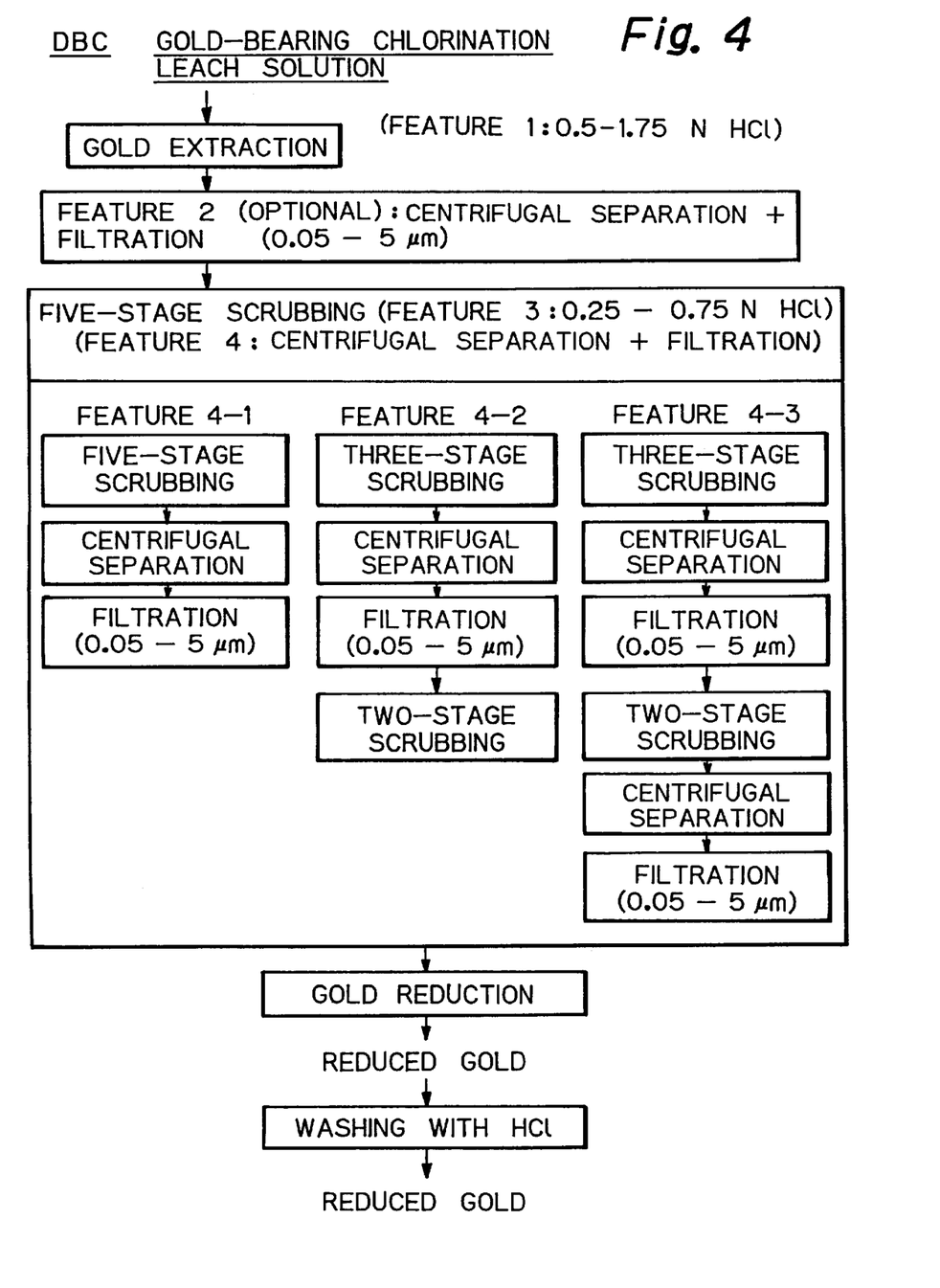
FIG. 4 is a flowsheet describing various embodiments for the operation of the invention method.

Various embodiments of the invention will now be described in detail with reference to the flowsheet shown in FIG. 4.

The gold recovery method of the invention comprises basically the steps of solvent extraction from a gold bearing chlorination leach solution with DBC, scrubbing the resulting gold bearing organic phase with hydrochloric acid and reducing gold from the organic phase with an added aqueous solution of a reducing reagent. Each of these steps is performed with either one of the following features incorporated, except that features 1 and 3 are not included within the scope of the invention unless they are combined together, (Feature 1)

Before the solvent extraction of the gold bearing chlorination leach solution, its hydrochloric acid concentration is adjusted to 0.5–1.75 N. Take, for example, the case of leaching anode slimes with hydrochloric acid of about 3 N to separate silver as the leach residue; the concentration of hydrochloric acid in the resulting gold bearing chlorination leach solution may be adjusted to 0.5–1.75 N by addition of water.

(Feature 2, as required)

Before scrubbing, the gold bearing organic phase is separated into the aqueous and the organic phase by centrifugal separation and the organic phase is filtered with a filter having an opening size of 0.05–5 $\mu$m so as to remove the liquid content. Centrifugal separation may be performed with a centrifugal separator named "Model K3 No. 160" produced by Kansai Centrifugal Separator M. F. G. Co., Ltd. and satisfactory results are preferably obtained at more than 10,000 rpm of its rotating speed.

(Feature 3)

The gold bearing organic phase is scrubbed with 0.25–0.75 N hydrochloric acid. With the concentration of hydrochloric acid being adjusted to be lower than in previous methods, impurities can readily be transferred from the DBC phase into the aqueous phase. The scrubbing itself may be implemented by any conventional method, preferably with the ratio of the aqueous to the organic phase being adjusted to about 1:1.

(Feature 4-1)

After five-stage scrubbing, centrifugal separation is effected and the organic phase is then filtered with a filter having an opening size of 0.05–5 $\mu$m.

(Feature 4-2)

After three-stage scrubbing, centrifugal separation is effected and the organic phase is then filtered with a filter having an opening size of 0.05–5 $\mu$m, with the resulting organic phase being subjected to two additional stages of scrubbing.

(Feature 4-3)

After three-stage scrubbing, the gold bearing organic phase is separated into the aqueous and the organic phase by centrifugal separation and the organic phase is then filtered with a filter having an opening size of 0.05–5 $\mu$m, subjected to two additional stages of scrubbing, separated from the aqueous phase by centrifugal separation and further filtered with a filter having an opening size of 0.05–5 $\mu$m.

The multi-stage scrubbing may be performed on either a batch or continuous basis in either a concurrent or countercurrent fashion but preferably it is performed continuously in a countercurrent fashion. The centrifugal separation may be performed with a centrifugal separator named "Model KS No. 160" produced by Kansai Centrifugal Separator M. F. G. Co., Ltd. and satisfactory results are obtained by implementing configuration at more than 10,000 rpm of rotating speed of the separator. Upon centrifugal separation, the material is separated into the aqueous and organic and phases and if the organic phase is filtered with a filter having an opening size of 0.05–5 $\mu$m, the aqueous phase containing impurities is separated from the organic phase. The filtere may be of any conventional type such as the membrane filter manufactured by Roki-Techno Co., Ltd. By the combination of centrifugal separation and filtration steps, the organic (DBC) phase can be freed of impurities. In a typical operation, at least 1 ml of the aqueous solution is rejected as a result of separation from about 50 ml of an oil.

Figure 2:
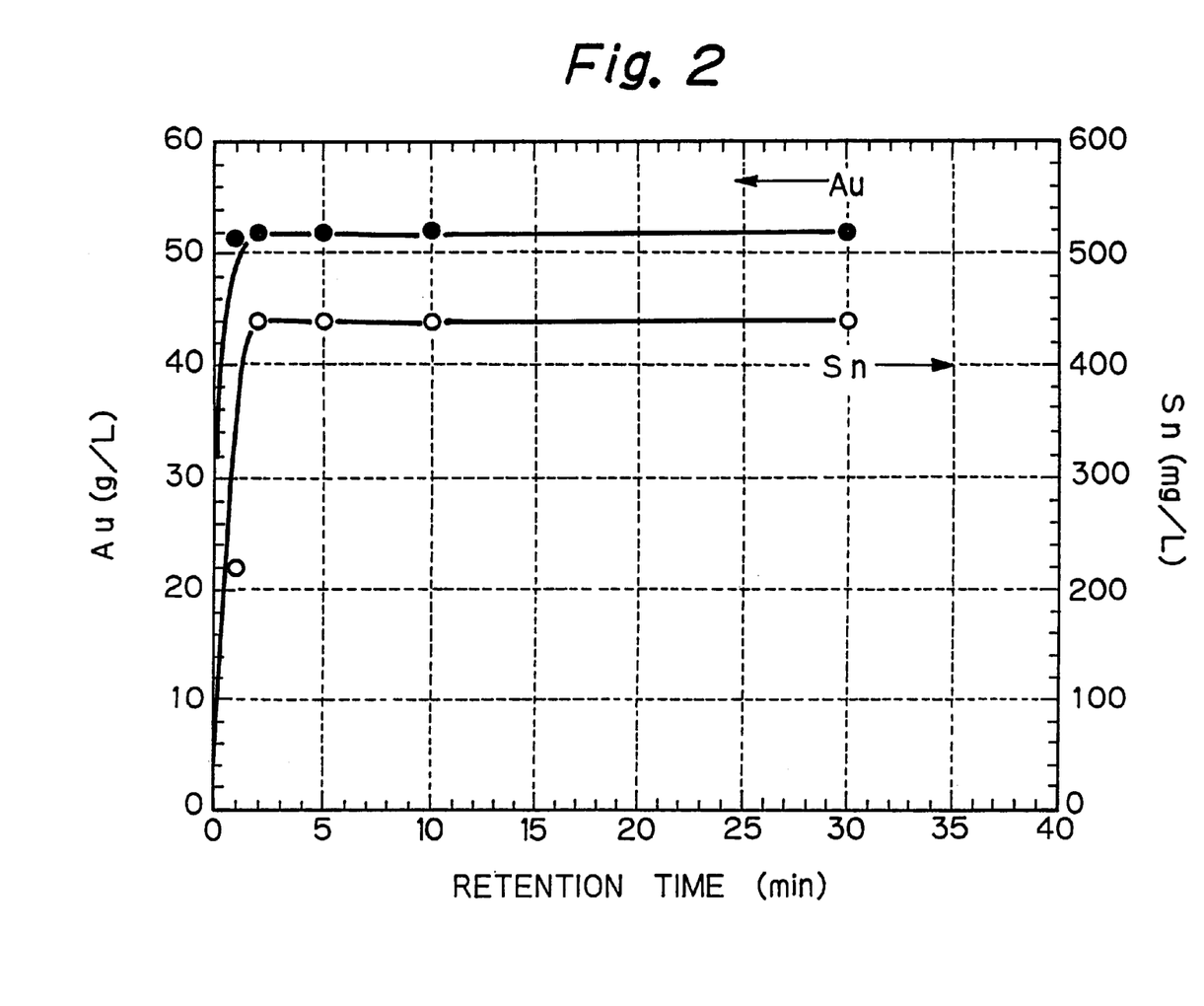
FIG. 2 is a graph showing the efficiencies of DBC extraction of gold and tin versus the retention time of extraction.
Figure 3:
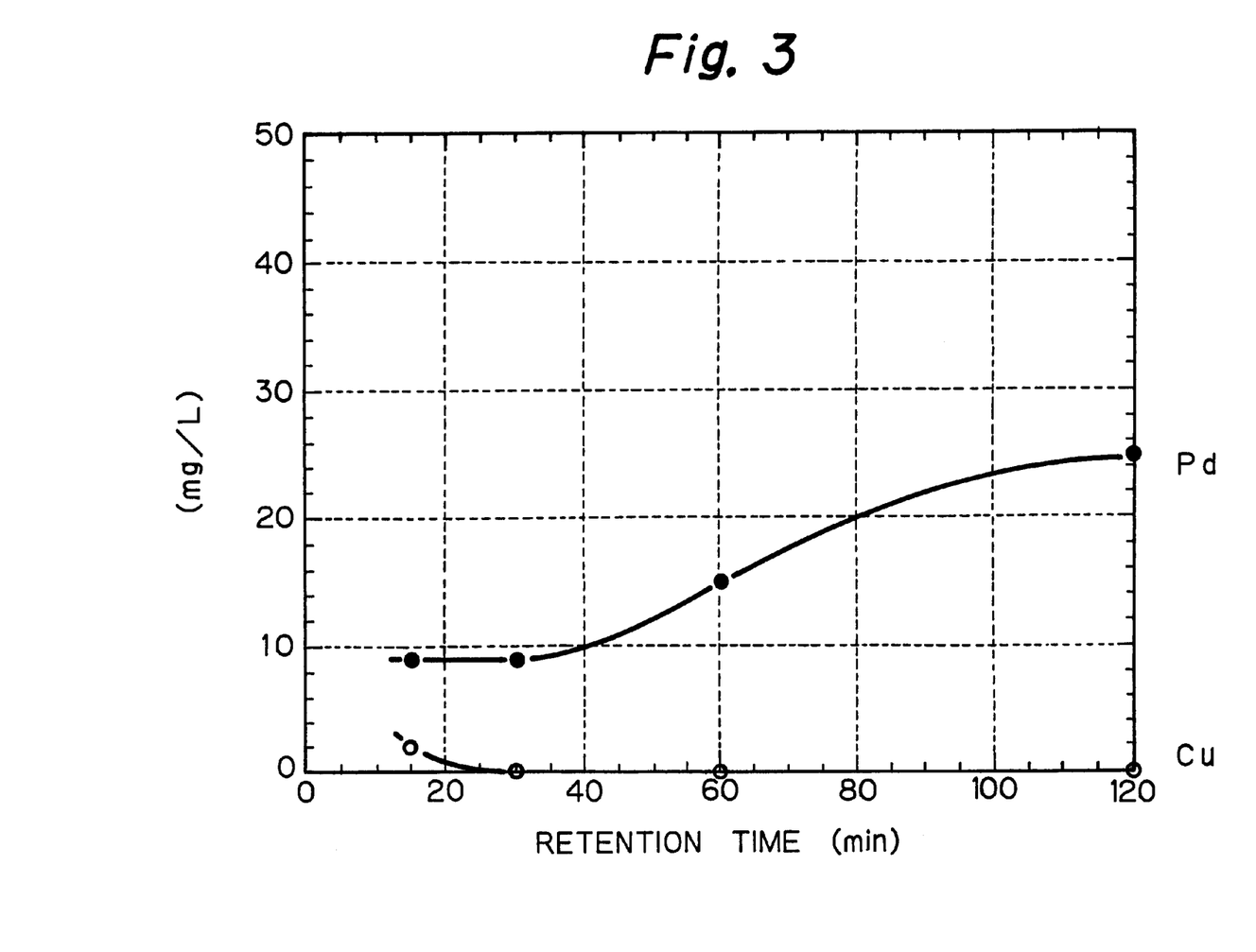
FIG. 3 is a graph showing the efficiencies of DBC extraction of palladium and copper versus the retention time of extraction.

It is worth mention here that a typical example of the gold bearing chlorination leach solution is what is obtained by leaching decopperized slimes with hydrochloric acid and hydorogen peroxide. The solvent extraction with DBC may be performed in a single stage or it may pass through two or more stages. After gold extraction with DBC, the concentrations of gold, tin, palladium and copper in DBC were analyzed to give the results shown in FIGS. 2 and 3. Referring to FIG. 3, the aqueous solution to be subjected to solvent extraction with DBC had an initial palladium concentration of 510 mg/L and an initial copper concentration of 2100 mg/L. From FIGS. 2 and 3, one can see that in order to prevent overextraction of palladium into the organic phase, the rentention time is preferably controlled less than or about 15 min.

The ratio of the aqueous phase to the organic phase should be adjusted such that the concentration of gold loaded in DBC will be about 50 g/L. The reducing reagent should preferably be oxalic acid and/or sodium oxalate. Reduction of gold may typically be performed by a single-stage batch system using an aqueous solution of the reducing reagent at a concentration of 20–50 g/L and at a temperature of 70–80° C. for a period of about 1–3 h. When oxalic acid is used as the reducing reagent, the reaction is thought to proceed as follows:

$$2HAuCl_4+3(COOH)_2 \rightarrow 2Au+6CO_2+8HCl$$

If the concentration of hydrochloric acid is high, oxalic acid may entirely or partly be replaced by sodium oxalate and the reaction is thought to proceed as follows to give satisfactory results:

$$2HAuCl_4+3(COONA)_2 \rightarrow 2Au+6CO_2+6NaCl+2HCl$$

The gold powder settles on the bottom of the reactor and may be washed and dried to yield the final product.

Various grades of gold powder were prepared by the following basic procedure, with individual steps being adapted to comply with specific requirements.

A gold bearing chlorination leach solution 9 Liters was subjected to one-stage solvent extraction with DBC (aqueous to organic phase ratio=25:1) over 10 min; the resulting gold bearing organic phase was scrubbed through five stages in a continuous countercurrent fashion using hydrochloric acid (aqueous to organic phase ratio=1:1); thereafter, an aqueous solution of oxalic acid (46 gl) was added at 80° C. to the gold bearing organic phase and the mixture was held for 2 h to have a gold powder settle on the bottom of the reactor; the settling gold powder was washed with hydrochloric acid and dried to yield the final product, which was subsequently analyzed for the purity of gold.

EXAMPLE 1

(1) The gold bearing chlorination leach solution had a hydrochloric acid concentration of 1.5 N.

(2) The solvent extraction was performed over 15 min.

(3) Prior to scrubbing, the solvent (organic phase) was separated by centrifugal separation and filtered with a filter having an opening size of 5 $\mu$m.

(4) The scrubbing hydrochloric acid had a concentration of 0.5 N.

(5) After the first three stages of scrubbing, the gold bearing organic phase was separated by centrifugal separation into the aqueous and the organic phases and the separated organic phase was filtered with a filter having an opening size of 5 $\mu$m; the resulting organic phase was subjected to two-stage scrubbing, followed by centrifugal separation into the aqueous and organic phases, with the separated organic phase being then subjected to filtration with a filter having an opening size of 5 $\mu$m.

(6) Oxalic acid was used to as the reducing reagent.

(7) The hydrochloric acid used for washing the gold powder was at room temperature.

EXAMPLE 2

The procedure of Example 1 was repeated, except that no filtration was effected after the practice of three-stage scrubbing.

EXAMPLE 3

The procedure of Example 1 was repeated, except that the gold powder was washed with boiling hydrochloric acid.

EXAMPLE 4

The procedure of Example 1 was repeated except on the following points: the extraction in step (2) was performed over 30 min; step (3) was not performed; and neither centrifugal separation nor filtration was effected in step (5).

EXAMPLE 5

The procedure of Example 1 was repeated except on the following points: the extraction in step (2) was performed over 30 min; in both steps (3) and (5), a filter having an opening size of 0.1 $\mu$m was used to effect filtration.

EXAMPLE 6

The procedure of Example 5 was repeated except that the gold bearing chlorination leach solution had a hydrochloric acid concentration of 0.5 N.

Comparative Example 1

A gold bearing chlorination leach solution having a hydrochloric acid concentration of 1.5 N was subjected to extraction with DBC over 15 min and the resulting gold bearing organic phase was scrubbed with 1.5 N hydrochloric acid. Neither centrifugal separation nor filtration was performed. Sodium oxalate was used as the reducing reagent. The gold powder was washed with hydrochloric acid at room temperature.

Comparative Example 2

The procedure of Comparative Example 1 was repeated except that oxalic acid was used as the reducing reagent.

Comparative Example 3

(1) The gold bearing chlorination leach solution had a hydrochloric acid concentration of 1.5 N.

(2) The solvent extraction was performed over 60 min.

(3) The solvent (organic phase—was separated by centrifugal separation and filtered with a filter having an opening size of 0.1 $\mu$m.

(4) The scrubbing hydrochloric acid had a concentration of 0.5 N.

(5) After the first three stages of scrubbing, the gold bearing organic phase was separated by a centrifugal separator into the aqueous and organic phases and the separated organic phase was filtered with a filter having an opening size of 5 $\mu$m; the resulting organic phase was subjected to two-stage scrubbing, followed by centrifugal separation into the aqueous and organic phases, with the separated organic phase being then subjected to filtration with a filter having an opening size of 5 $\mu$m.

(6) Oxalic acid was used as the reducing reagent.

(7) The hydrochloric acid used to wash the gold powder was at room temperature.

Comparative Example 4

The procedure of Comparative Example 3 was repeated except on the following points: a filter having an opening size of 5 μm was used in the filtration step 3 prior to the scrubbing operation; a filter having an opening size of 0.1 μm was used in the filtration step 5 after the first three stages of scrubbing; and a filter having an opening size of 1 μm was used in the filtration step 5 after the two stage scrubbing.

The samples of gold powder prepared in Examples 1–6 were analyzed for impurities and the results are compared in Table 1 with the data obtained for the comparative examples. Table 1 shows that gold can be recovered in high purity by the practice of the embodiments within the scope of the invention.

TABLE 1

| | | | | | | | Impurity Content, ppm | | | | | | | | |
|---|---|---|---|---|---|---|---|---|---|---|---|---|---|---|---|
| | | Au (%) | Ag | Pt | Pd | Cu | Se | Te | As | Sb | Bi | Pb | Sn | Fe | Ti |
| Example | 1 | 99.999 | 0.5 | <0.5 | <0.5 | | <1 | <1 | | <1 | <1 | <0.5 | <1 | 0.2 | |
| | 2 | 99.999 | 0.3 | 0.7 | 1.2 | 1.1 | <1 | 1.8 | <1 | <1 | <1 | <0.5 | <1 | 1.8 | |
| | 3 | 99.999 | <1 | <1 | <1 | <1 | <1 | <1 | <1 | <1 | <1 | <1 | <1 | <1 | |
| | 4 | 99.999 | 0.4 | <0.5 | 3.7 | <1 | <1 | <0.2 | <1 | <1 | <1 | <0.5 | <1 | 0.2 | <1 |
| | 5 | 99.999 | 0.4 | <0.5 | 1.1 | 1.8 | <1 | 0.2 | <1 | <1 | <1 | <0.5 | <1 | 2.9 | <1 |
| | 6 | 99.999 | 0.4 | <0.5 | 0.5 | <1 | <1 | 0.3 | <1 | <1 | <1 | <0.5 | <1 | 1.3 | <1 |
| Comparative Example | 1 | 99.9 | 53 | 104 | 34 | | 71 | 30 | | 22 | <1 | 1 | 210 | 2 | <1 |
| | 2 | 99.97 | 92 | <1 | <1 | | 73 | 30 | | 20 | 2 | <3 | 10 | 1 | <1 |
| | 3 | 99.998 | 2 | <0.5 | 3.1 | 7.3 | <1 | <0.2 | <1 | <1 | <1 | 2.2 | <1 | 0.3 | <1 |
| | 4 | 99.998 | 1.9 | 0.7 | 10.2 | 1 | <1 | <0.2 | <1 | <1 | <1 | <0.5 | <1 | 3 | <1 |

What is claimed is:

1. A method of recovering gold from a gold bearing chlorination leach solution which comprises the steps of
   (1) adjusting the concentration of hydrochloric acid in the gold bearing chlorination leach solution to 0.5–1.75 N;
   (2) extracting gold in the leach solution with dibutyl carbitol used as an organic extractant:
   (3) centrifugally separating the resulting gold bearing organic phase into the aqueous and the organic phases;
   (4) filtering the separated organic phase with a filter having an opening sized of 0.05–5 μm to remove the aqueous phase containing impurities;
   (5) scrubbing the filtered organic phase with hydrochloric acid of 0.2–0.75 N in a five-stage process to obtain the gold bearing organic phase;
   (6) centrifugally separating the gold bearing organic phase into the aqueous and the organic phases;
   (7) filtering the separated organic phase with a filter having an opening sized of 0.05–5 μm to remove the aqueous phase containing impurities;
   (8) adding a reducing reagent to the obtained organic phase to settle gold powder; and
   (9) washing the settled gold powder with hydrochloric acid to recover gold in purity higher than 99.998 wt %.

2. The method according to claim 1, where in the time of step (2) is adjusted not to exceed 15 min.

3. A method of recovering gold from a gold bearing chlorination leach solution which comprises the steps of
   (1) adjusting the concentration of hydrochloric acid in the gold bearing chlorination leach solution to 0.5–1.75 N;
   (2) extracting gold in the leach solution with dibutyl carbitol used as an organic extractant:
   (3) centrifugally separating the resulting gold bearing organic phase into the aqueous and the organic phases;
   (4) filtering the separated organic phase with a filter having an opening sized of 0.05–5 μm to remove the aqueous phase containing impurities;
   (5) scrubbing the filtered organic phase with hydrochloric acid of 0.25–0.75 N in a three-stage process to obtain the gold bearing organic phase;
   (6) centrifugally separating the gold bearing organic phase into the aqueous and the organic phases;
   (7) filtering the separated organic phase with a filter having an opening sized of 0.05–5 μm to remove the aqueous phase containing impurities;
   (8) scrubbing the filtered organic phase with hydrochloric acid of 0.25–0.75 N in a two-stage process to obtain the gold bearing organic phase;
   (9) adding a reducing reagent to the obtained organic phase to settle gold powder; and
   (10) washing the settled gold powder with hydrochloric acid to recover gold in purity higher than 99.998 wt %.

4. The method according to claim 3, wherein the time of step (2) is adjusted not to exceed 15 min.

5. A method of recovering gold from a gold bearing chlorination leach solution which comprises the steps of
   (1) adjusting the concentration of hydrochloric acid in the gold bearing chlorination leach solution to 0.5–1.75 N;
   (2) extracting gold in the leach solution with dibutyl carbitol used as an organic extractant;
   (3) centrifugally separating the resulting gold bearing organic phase into the aqueous and the organic phases;
   (4) filtering the separated organic phase with a filter having an opening sized of 0.05–5 μm to remove the aqueous phase containing impurities;
   (5) scrubbing the filtered organic phase with hydrochloric acid of 0.25–0.75 N in a three-stage process to obtain the gold bearing organic phase;
   (6) centrifugally separating the gold bearing organic phase into the aqueous and the organic phases;
   (7) filtering the separated organic phase with a filter having an opening sized of 0.05–5 μm to remove the aqueous phase containing impurities;

(8) scrubbing the filtered organic phase with hydrochloric acid of 0.25–0.75 N in a two-stage process to obtain the gold bearing organic phase;

(9) centrifugally separating the gold bearing organic phase into the aqueous and the organic phases;

(10) filtering the separated organic phase with a filter having an opening sized of 0.05–5 μm to remove the aqueous phase containing impurities;

(11) adding a reducing reagent to the obtained organic phase to settle gold powder; and (12) washing the settled gold powder with hydrochloric acid to recover gold in purity higher than 99.998 wt %.

6. The method according to claim 5 wherein the time of step (2) is adjusted not to exceed 15 min.

\* \* \* \* \*

UNITED STATES PATENT AND TRADEMARK OFFICE
CERTIFICATE OF CORRECTION

PATENT NO.    : 5,942,024

DATED         : August 24, 1999

INVENTOR(S)   : YOSHIFUMI et al.

It is certified that error appears in the above-identified patent and that said Letters Patent is hereby corrected as shown below:

Title page, item [54], "METHOD OF RECOVERING GOLD POWDER" should be changed to --METHOD OF RECOVERING GOLD--, and col. 1.

Signed and Sealed this

Twelfth Day of September, 2000

Attest:

Q. TODD DICKINSON

*Attesting Officer*    *Director of Patents and Trademarks*